(12) United States Patent
Hsu et al.

(10) Patent No.: US 11,872,832 B2
(45) Date of Patent: Jan. 16, 2024

(54) TEXTURE-BASED AUTHENTICATION OF DIGITAL IDENTITY DOCUMENTS

(71) Applicant: IDEMIA IDENTITY & SECURITY USA LLC, Reston, VA (US)

(72) Inventors: Rein-Lien Hsu, Edison, NJ (US); Brian Martin, Sudbury, MA (US)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 71 days.

(21) Appl. No.: 17/558,629

(22) Filed: Dec. 22, 2021

(65) Prior Publication Data
US 2023/0191823 A1   Jun. 22, 2023

(51) Int. Cl.
*G06K 9/00*   (2022.01)
*B42D 25/30*   (2014.01)
*G06V 10/54*   (2022.01)

(52) U.S. Cl.
CPC ............. *B42D 25/30* (2014.10); *G06V 10/54* (2022.01)

(58) Field of Classification Search
CPC ...................................................... G06V 10/54
See application file for complete search history.

(56) References Cited

U.S. PATENT DOCUMENTS

| | | | | |
|---|---|---|---|---|
| 7,920,714 B2 * | 4/2011 | O'Neil | ................... | G07D 7/206 |
| | | | | 382/209 |
| 9,406,030 B2 * | 8/2016 | Dolev | ................... | G06N 20/00 |
| 9,678,991 B2 * | 6/2017 | Sohn | ...................... | G06V 10/54 |
| 2005/0116052 A1 * | 6/2005 | Patton | ................ | H04N 1/32208 |
| | | | | 235/494 |
| 2006/0017959 A1 * | 1/2006 | Downer | ................ | G07D 7/004 |
| | | | | 358/1.14 |

(Continued)

FOREIGN PATENT DOCUMENTS

| | | | | |
|---|---|---|---|---|
| CN | 101789199 A | * | 7/2010 | |
| CN | 102651074 A | * | 8/2012 | |
| EP | 3244349 A1 | * | 11/2017 | ............. B42D 25/30 |

(Continued)

OTHER PUBLICATIONS e-Counterfeit: a mobile-server platform for document counterfeit detection, Albert Berenguel et al., IAPR , 2107, pp. 15-20 (Year: 2017).*

(Continued)

*Primary Examiner* — Jayesh A Patel
(74) *Attorney, Agent, or Firm* — Cabinet Beau De Lomenie; Brian Gordaychik (57) ABSTRACT

Techniques for texture-based authentication of digital identity documents are disclosed. The disclosed techniques include authentication based on global texture information and/or on local texture information. Global texture-based authentication may include generating a global texture profile for an identity document image and comparing the global texture profile with a stored profile associated with a jurisdiction class of the identity document. Local texture-based authentication may include generating one or more local texture patches representative of texture information of one or more select local blocks of the ID. The one or more local texture patches are provided as input to one or more local detectors each trained to detect the presence of a forgery based on a target manipulation space.

11 Claims, 8 Drawing Sheets

(56) References Cited

U.S. PATENT DOCUMENTS

2020/0110932 A1* 4/2020 Berger .................. G06F 18/22

FOREIGN PATENT DOCUMENTS

| WO | WO2018071768 A1 | 4/2018 | | |
|---|---|---|---|---|
| WO | WO-2020089907 A1 * | 5/2020 | ........... | G06T 7/0002 |

OTHER PUBLICATIONS

Document fraud detection by ink analysis using texture features and histogram matching, Apurba Gorai et al., IEEE, 2016, pp. 4512-4517 (Year: 2016).*

Automatic Documents Counterfeit Classification Using Image Processing and Analysis, Rafael Vieira et al., Springer, 2017, pp. 400-407 (Year: 2017).*

Image forgery detection review, Hiba Benhamza et al., IEEE, 2021, pp. 1-7 (Year: 2021).*

Banknote counterfeit detection through background texture printing analysis, Albert Berenguel et al., IAPR, 2016, pp. 66-71 (Year: 2016).*

Evaluation of texture descriptors for validation of counterfeit documents, Albert Berenguel et al., CPS, 2017, pp. 1237-1242 (Year: 2017).*

Using Filter—Texture Classification, V. Andrearczyk et al., arXiv, 2016, pp. 1-12 (Year: 2016).*

Tackling fraud with physical tamper detection, GBG IDscan https://www.gbgplc.com/en/blog/tackling-fraud-with-physical-tamper-detection/ 2021.

Laleh Armi et al Texture Image Analysis and Texture Classification Methods—A Review International Online Journal of Image Processing and Pattern Recognition vol. 2, No. 1, pp. 1-29, 2019.

V. Andrearczyk et al Using Filter Banks in Convolutional Neural Networks for Texture Classification Pattern Recognition Letters. DOI: 10.1016/j.patrec.2016.08.016 Aug. 16, 2016.

Leon A. Gatys et al A Neural Algorithm of Artistic Style arXiv:1508.06576v2 [cs.CV] Sep. 2, 2015.

* cited by examiner

TEXTURE-BASED AUTHENTICATION OF DIGITAL IDENTITY DOCUMENTS

FIELD

The invention relates generally to authentication of identity documents, and more particularly to the authentication of digital identity documents using texture information.

BACKGROUND

Today's increasing demand for online and mobile verification of identity documents has created a strong need for authentication solutions with various fraud detection capabilities.

Existing systems can generally be divided between active and passive solutions.

Active solutions rely on embedding anti-counterfeiting security features such as watermarks, linecodes, etc. in an identity document to increase the difficulty of tampering with the document. Such solutions however may not be effective at detecting tampering that does not affect the embedded security features.

Passive solutions are based on checking whether an identity document contains traces of forgery or manipulation in any portion of the document. Typically, these solutions use pixel-level analysis to identify predetermined tampering operations, and generally focus on checking manipulations around personally identifiable information (PII) areas only.

BRIEF SUMMARY

Systems and methods for texture-based authentication of digital identity documents are disclosed.

In one aspect, embodiments include authentication based on global texture information extracted from a digital image representative of an identity document.

Global texture-based authentication may include generating a global texture profile for an identity document image and comparing the global texture profile with a stored profile associated with a jurisdiction class of the identity document.

In embodiments, global texture-based authentication may be configured to be insensitive to PII and to tolerate wide variations in the ambient illumination captured in the digital image.

In another aspect, embodiments may, additionally or alternatively, include authentication based on local texture information extracted from the digital image.

Local texture-based authentication may include generating one or more local texture patches representative of texture information of one or more select local blocks of the identity document. The one or more local texture patches are provided as input to one or more local detectors each trained to detect the presence of a forgery based on a target manipulation space.

The target manipulation space may be, without limitation, physical portrait photo substitution, digital image splicing, inpainting, resampling, photocopy recapture, or LCD screen recapture.

In embodiments, the local detectors may each include a texture-based convolutional neural network (CNN) classifier; a machine learning-based classifier; or an Error Level Analysis (ELA)-based classifier.

Classifiers may be trained using augmented training data designed to simulate the target manipulation space of the classifier. In an embodiment, a style-transfer based network may be used to synthesize images with a particular global document style.

BRIEF DESCRIPTION OF THE DRAWINGS

The accompanying drawings, which are incorporated herein and form a part of the specification, illustrate the present disclosure and, together with the description, further serve to explain the principles of the disclosure and to enable a person skilled in the pertinent art to make and use the disclosure.

DETAILED DESCRIPTION OF EMBODIMENTS

Figure 1:
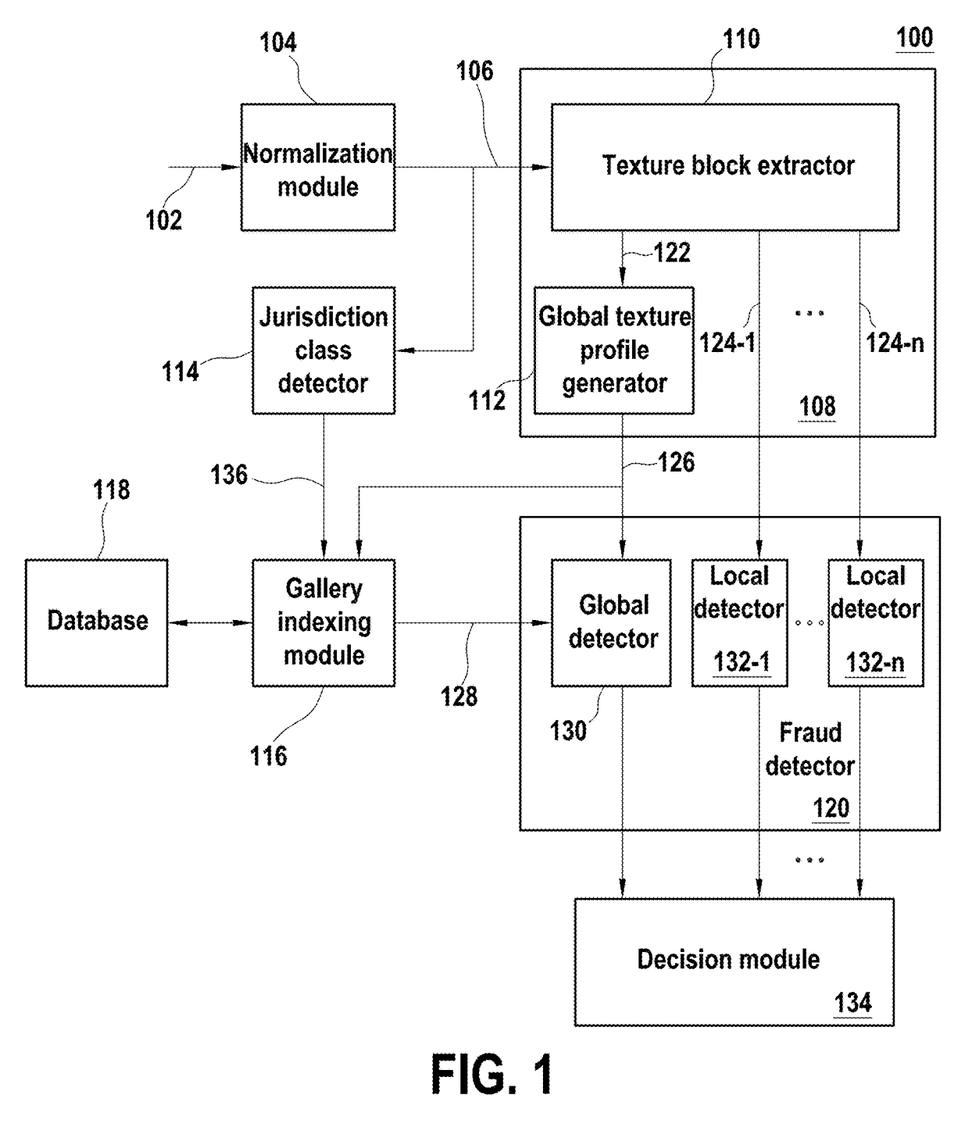
FIG. 1 illustrates an example authentication system according to an embodiment.

FIG. 1 illustrates an example authentication system 100 according to an embodiment of the present disclosure. As would be understood by a person of skill in the art based on the teachings herein, system 100 is provided for the purpose of illustration only and is not limiting of embodiments of the present disclosure.

As shown in FIG. 1, system 100 includes a normalization module 104, a texture information generator 108, a jurisdiction class detector 114, a gallery indexing module 116, a database 118, a fraud detector 120, and a decision module 134.

In an embodiment, operation of system 100 begins by receiving a digital image 102. The digital image 102 represents an identity document (ID), such as a national identity card, a passport, or a driver's license, for example.

Normalization module 104 may perform various transformations on the image 102. For example, if the image is in color, the image 102 may be transformed to a grayscale image. Additionally, normalization module 104 may flat render the image 102 to remove any content not related to the ID represented by the image. For example, content outside of a detected boundary of the ID may be removed.

The normalized image 106 is then provided to texture information generator 108. In another embodiment, the normalized image 106 may also be provided to jurisdiction class detector 114.

Texture information generator 108 is configured to generate, based on the digital image 106, a global texture profile 126 representative of global background texture information of the ID and/or one or more local texture patches 124 representative of texture information at one or more select local blocks of the ID.

In an embodiment, texture information generator 108 may include a texture block extractor 110 and a global texture profile generator 112.

Texture block extractor 110 may be configured to extract global texture information 122 and/or local texture information 124 from the image 106. As would be understood by a person of skill in the art based on the teachings herein, texture information refers to information that quantifies the perceived texture of an image. The perceived texture is a function of the spatial variation of brightness intensity in the image.

Global texture information 122 may correspond to texture information extracted at a plurality of blocks of the image distributed over the entire area of the digital image. Local texture information 124 may correspond to texture information extracted at specific local areas of the image, for example at or around specific features of the image. In an embodiment, the local texture information 124 may include one or more sets of texture information (124-1, . . . , 124-n) each tailored to enable the detection of a particular forgery manipulation (manipulation space) and/or tailored for a specific type of local detector. Each set of texture information 124-1, . . . , 124-n may include one or more local texture patches as further described below.

Figure 2A:
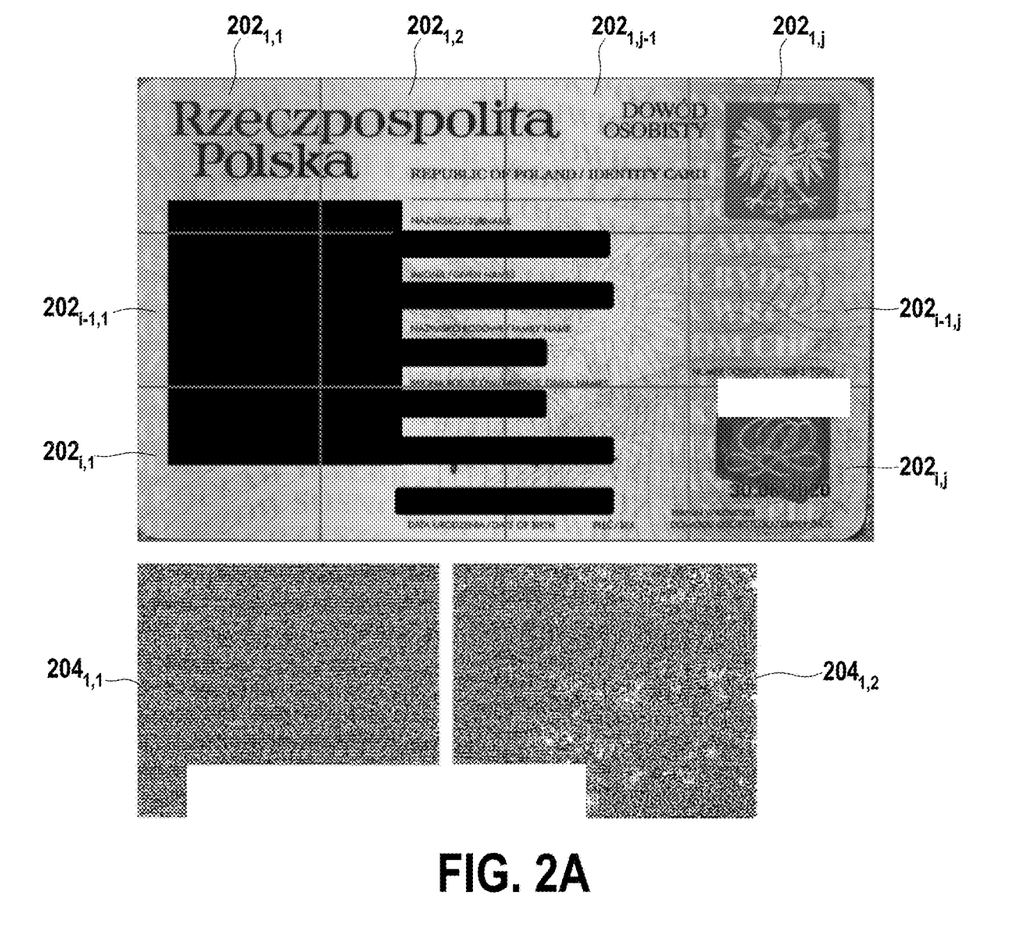
FIG. 2A illustrates an example approach for extracting global texture information from a digital image according to an embodiment.

FIG. 2A illustrates an example approach for extracting global texture information from a digital image according to an embodiment. As shown in FIG. 2A, the digital image may be partitioned into a plurality of blocks 202, according to a defined number of rows and columns. Texture information may then be extracted at each of the blocks 202. The extracted texture information may accordingly capture texture with a wider correlation, as illustrated, for example, by texture blocks $204_{1,0}$ and $204_{1,1}$ corresponding respectively to blocks $202_{1,1}$ and $202_{1,2}$ of the digital image.

Figure 2B:
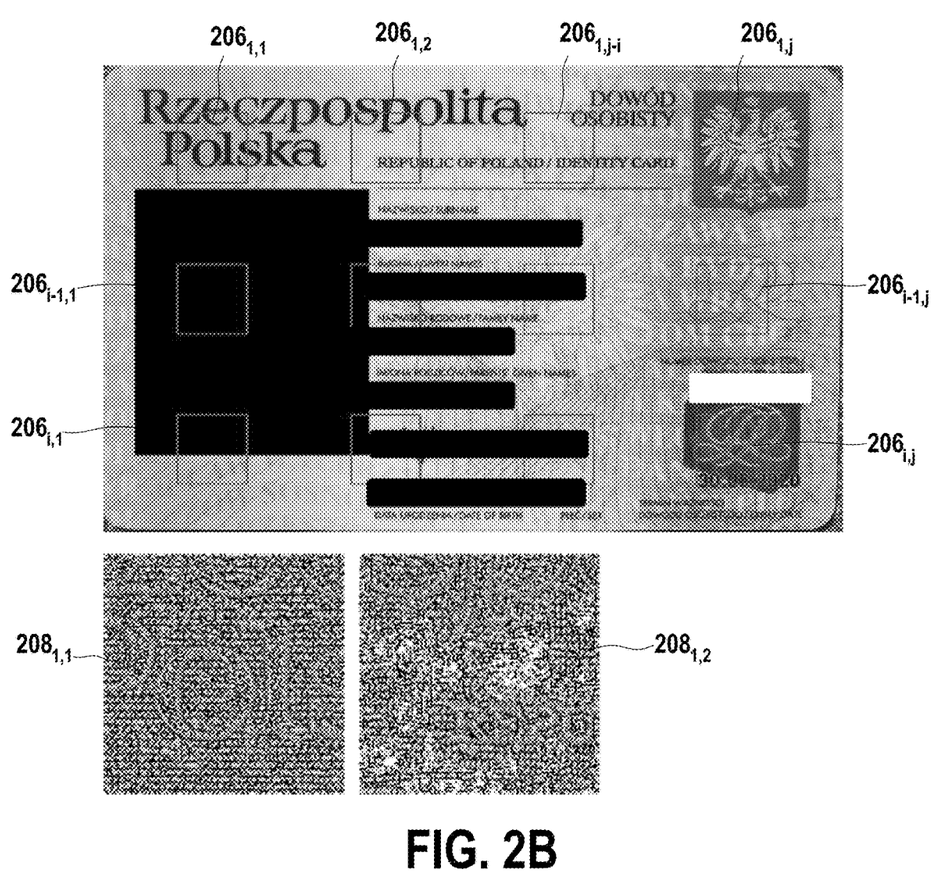
FIG. 2B illustrates another example approach for extracting global texture information from an image according to an embodiment.

In another approach, as shown in FIG. 2B, the global texture information may be extracted from smaller, regional blocks 206 distributed over the entire area of the digital image. The extracted texture information may accordingly capture regional texture as illustrated, for example, by texture blocks $208_{1,1}$ and $208_{1,2}$ corresponding respectively to blocks $206_{1,1}$ and $206_{1,2}$ of the digital image.

Figure 3:
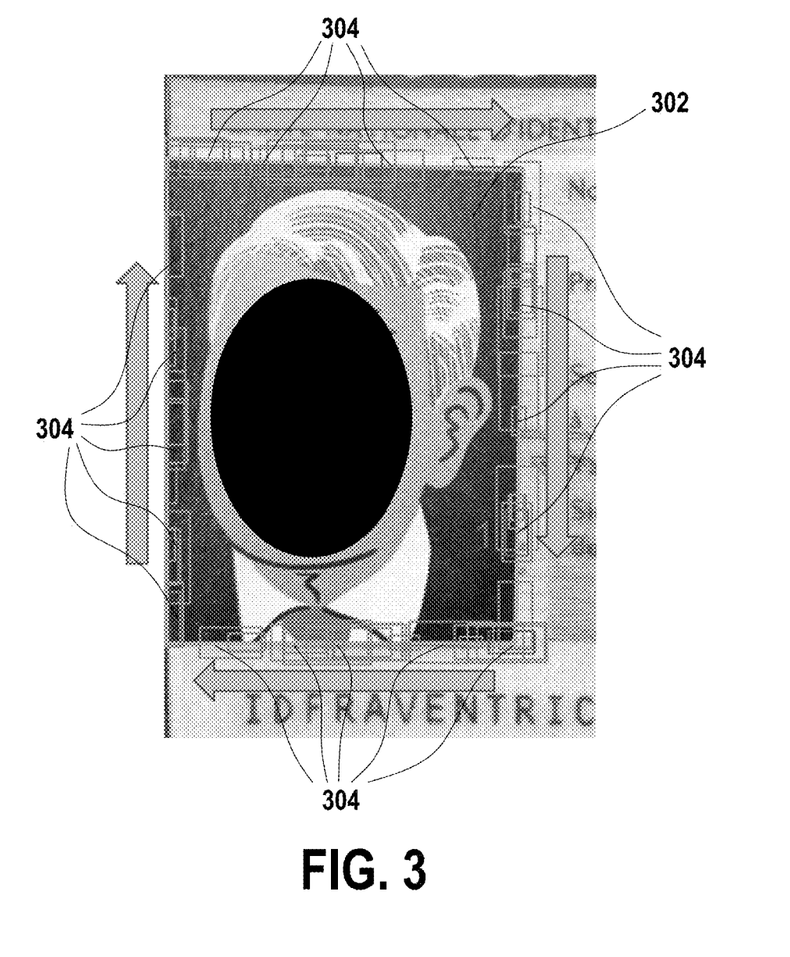
FIG. 3 illustrates an example approach for extracting local texture information according to an embodiment.

FIG. 3 illustrates an example approach for extracting local texture information from a digital image according to an embodiment. According to this example approach, the local texture information includes one or more local texture patches representative of texture information of one or more select local blocks of the ID.

In an embodiment, generating the one or more local texture patches comprises detecting, based on a target manipulation space, one or more features of interest of the ID.

According to embodiments, the target manipulation space can be, without limitation, physical portrait photo substitution, digital image splicing, inpainting, resampling, photocopy recapture, or LCD screen recapture.

As would be understood by a person of skill in the art based on the teachings herein, physical portrait photo substitution refers to the replacement of the portrait photo on a physical ID; digital splicing refers to the digital manipulation of an image to add external content (e.g., to change the PII) into the image; inpainting refers to the removal of content from an image using pixels coming from the same image; resampling refers to the use of interpolation to geometrically transform a digital image or a portion of an image; photocopy recapture refers to the generation of a digital image by photographing a physical copy of a document; and LCD screen recapture refers to the generation of a digital image by photographing an LCD screen display of a document For example, in FIG. 3, the target manipulation space is physical portrait photo substitution, and the one or more features of interest may include a portrait photo of the ID. Various feature detection techniques may be used to detect features of interest. For example, to detect a portrait photo in an ID, the Hough transform may be used to detect the lines corresponding to the frame of the portrait photo.

After detecting the one or more features of interest in the ID, the one or more select local blocks of the ID are defined as a function of the detected features of interest. Subsequently, texture information is extracted at each of the one or more select local blocks to generate the one or more local texture patches. For example, in FIG. 3, after detecting the portrait photo 302, one or more local select blocks 304 are defined as rectangular or square blocks straddling the top, bottom, left, and right boundaries of the portrait photo. Texture information is then extracted from one or more of the select local blocks 304 to obtain the one or more local texture patches.

In an embodiment, texture block extractor 110 may be configured to automatically set to black pixel blocks of the digital image that include personally identifiable information (PII), prior to extracting the respective texture information at each of the plurality of blocks.

Returning to FIG. 1, texture block extractor 110 may be configured to provide global texture information 122 to global texture profile generator 112. Texture block extractor 110 may also be configured to provide local texture information 124 to one or more local detectors 132 of fraud detector 120.

Global texture profile generator 112 may be configured to generate a global texture profile, based on global texture information 122, representative of global background texture information of the ID.

Figure 4:
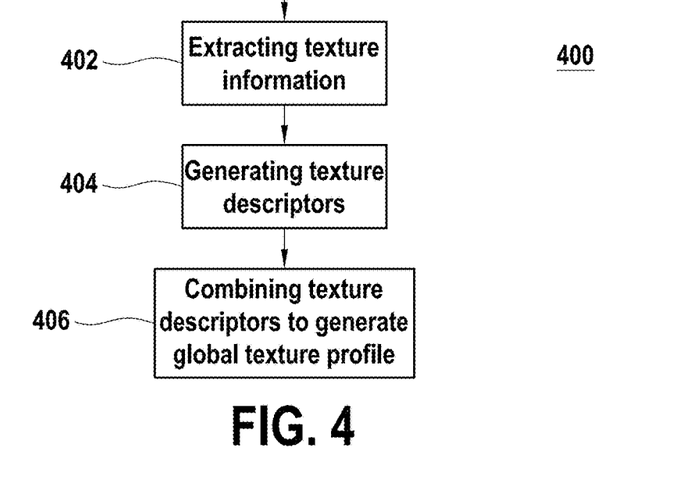
FIG. 4 is a flow chart that illustrates an example method for generating a global texture profile according to an embodiment.

FIG. 4 is a flow chart that illustrates an example process 400 for generating a global texture profile according to an embodiment. One or more steps of process 400 may be performed by texture block extractor 110 or by global texture profile generator 112.

As shown in FIG. 4, process 400 begins in step 402, which includes extracting, based on the digital image, respective texture information at each of a plurality of blocks distributed over the entire area of the digital image. Step 402 may be performed by text texture block extractor 110, for example.

Next in step 404, the process includes generating a respective texture descriptor based on the extracted respective texture information for each of the plurality of blocks. Step 404 may be performed by texture profile generator 112.

In an embodiment, the texture descriptor generated for each of the plurality of blocks includes one or more of: a histogram-based texture descriptor, a correlation-type texture descriptor, or a local binary pattern (LBP)-based texture descriptor. The histogram-based texture descriptor captures statistics of finer local ($2^{nd}$-order) differences among texture pixels. The correlation-type descriptor captures coarser and wider correlation between larger areas (patches) of texture pixels (like moiré patterns). The LBP-based texture descriptor captures statistics of relative variations of local intensity of texture pixels.

In an embodiment, the texture descriptor for a given block includes a combination of descriptors of the different types mentioned above. For example, the texture profile can include a concatenation of multiple segments each obtained using a different type of texture descriptor. The advantage of combining descriptors of different types to form the texture descriptor of a given block is that the resulting descriptor conveys a richer characterization of the texture of the given block.

Process 400 terminates in step 406, which includes combining the respective texture descriptors of the plurality of blocks to generate the global texture profile of the ID. In an embodiment, the combination of the respective texture descriptors of the plurality of blocks includes concatenating the respective texture descriptors to obtain the global texture profile of the ID.

Figure 5:
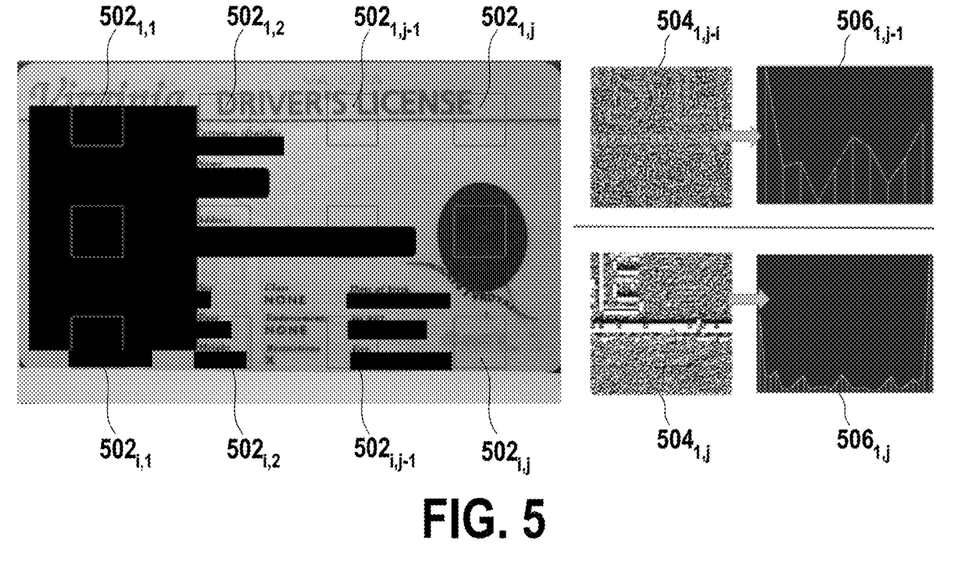
FIG. 5 is an example that illustrates the generation of texture descriptors according to an embodiment.

FIG. 5 is an example that illustrates the generation of texture descriptors according to an embodiment. As shown, texture information is extracted from a plurality of regional blocks 502 distributed over the entire area of the digital image. The texture information extracted from the blocks 502 may be as illustrated by texture blocks $504_{1,j-1}$ and $504_{1,j}$ corresponding respectively to blocks $502_{1,j-1}$ and $502_{1,j}$.

The texture descriptors may be histogram-based as illustrated by descriptors $506_{1,j-1}$ and $506_{1,j}$ which correspond respectively to texture blocks $504_{1,j-1}$ and $504_{1,j}$.

The texture descriptors of the plurality of blocks 502 are combined to generate a global texture profile of the digital image. In the case of histogram-based texture descriptors, the combination includes adding together the bins of the histograms to obtain a combined histogram.

Returning to FIG. 1, jurisdiction class detector 114 may be configured to detect a jurisdiction class 136 of the identity document based on the digital image 106. The jurisdiction class of an identity document may be defined by an issuing authority (e.g., country, state, etc.) and a category of the identity document (national identity card, passport, driver's license, etc.).

In an embodiment, jurisdiction class detector 114 may be configured to scan the image 106 and to use character recognition techniques to extract information relating to issuing authority and/or category of the identity document.

Jurisdiction class detector 114 provides the detected jurisdiction class 136 to gallery indexing module 116. In an embodiment, gallery indexing module 116 queries database 118, using the detected jurisdiction class 136, to retrieve a stored texture profile 128 associated with the detected jurisdiction class 136. In an embodiment, the stored texture profile 128 corresponds to a previously generated global texture profile for the detected jurisdiction class 136.

The previously generated global texture profile for a jurisdiction class may be generated based on a gallery image for the jurisdiction class and is referred to hereinafter as a gallery profile. The gallery image for a jurisdiction class is an image of an identity document that is known to be authentic for the jurisdiction class.

In an embodiment, the gallery profile for a jurisdiction class may be generated in the same manner as global texture profile 126, namely using normalization module 104, texture block extractor 110, and global texture profile generator 112. The gallery profile is then provided to gallery indexing module 116, which indexes and stores the gallery profile into database 118 based on its associated jurisdiction class detected by jurisdiction class detector 114.

According to embodiments, gallery profiles for a multitude of jurisdiction classes may be generated and stored in database 118 prior to live authentication using system 100.

Fraud detector 120 may be configured to detect the presence of a forgery in the digital image based on the global texture profile 126 or the one or more local texture patches 124. According to embodiments, the detected forgery may belong to one or more manipulation spaces, such as physical portrait photo substitution, digital image splicing, inpainting, resampling, photocopy recapture, or LCD screen recapture. In an embodiment, fraud detector 120 may include a global detector 130 and one or more local detectors 132.

Global detector 130 may be configured to detect forgeries based on global texture profile 126. In an embodiment, global detector 130 compares the global texture profile 126 to the stored texture profile 128 associated with the detected jurisdiction class of the identity document represented by the digital image 106.

Based on the comparison, the global detector 130 and/or a decision module 134 may identify the digital image 106 as a recaptured image from a photocopy or a computer screen, or as having an incorrect background layout for the jurisdiction class of the identity document, for example.

In an embodiment, two texture profiles are compared by measuring a difference for each type of descriptor inside the profile. The descriptor differences are then merged to obtain a final texture profile score. In an embodiment, the descriptor differences are calculated as distance metrics. For a histogram-based descriptor, the distance metric may be the intersection of two histograms (one from the global texture profile 126, the other from the stored texture profile 128). In an embodiment, a dropout policy to avoid high-noise bins may be employed. For a correlation-type descriptor, the distance metric may be a score mapping with a threshold to ensure that an aliasing signal of the global texture profile 126 is not larger than that of the stored texture profile 128.

In an embodiment, the global detector 130 may be configured to account, in the comparison, for ambient illumination variations between the digital image 106 and the gallery image used to generate the gallery profile 128. In an embodiment, this is made possible by ensuring that the descriptors used in the texture profile consist of only relative information, such as differences (or gradients), correlation coefficients, and statistics of intensity variations and gradients.

The setting to black of PII areas in the generation of the profiles as described above allows the profile comparison to be PII insensitive.

Local detectors 132-1, . . . , 132-*n* may each be configured to detect forgeries based on respective local texture patches 124. In an embodiment, each detector 132-*i* is configured to receive respective one or more local patches 124-*i* tailored for the specific manipulation space that the detector 132-*i* is intended to detect.

According to embodiments, local detectors 132-1, . . . , 132-*n* may be configured to detect, for example, one or more of: physical portrait photo substitution, digital splicing, inpainting, resampling, photocopy recapture, or LCD screen recapture.

In an embodiment, a local detector 132-*i* configured to detect physical portrait photo substitution may be configured to receive one or more local textures patches as illustrated in the example of FIG. 3 described above. In a similar manner, a local detector configured 132-*j* configured to detect digital splicing of PII may be configured to receive one or more local patches extracted at or in the neighbourhood of the PII of interest on the ID. On the other hand, a local detector 132-$k$ configured to detect photocopy recapture or LCD screen recapture may require only randomly extracted local texture patches.

Local detectors 132-1, . . . , 132-$n$ may each be implemented in various ways. Without limitation, local detectors 132-1, . . . , 132-$n$ may each include a texture-based convolutional neural network (CNN) classifier; a machine learning-based classifier; or an Error Level Analysis (ELA)-based classifier.

For the purpose of illustration and not limitation, a texture-based CNN classifier may be implemented as described in "Andrearczyk et al., *Using filter banks in convolutional neural networks for texture classification*. Pattern Recognition Letters, 84, 63-69, 2016," which is incorporated herein by reference in its entirety. As would be understood by a person of skill in the art, the implementation would be modified as needed to address the particular problem of the present disclosure.

For the purpose of illustration and not limitation, a machine learning-based classifier may be implemented as a Support Vector Machine (SVM) as described in "Armi et al., *Texture Image Analysis and Texture Classification Methods—a Review*. International Online Journal of Image Processing and Pattern Recognition, Vol. 2, No. 1, pp. 1-29, 2019," which is incorporated herein by reference in its entirety. As would be understood by a person of skill in the art, the implementation would be modified as needed to address the particular problem of the present disclosure.

For the purpose of illustration and not limitation, an ELA-based classifier is a classifier that acts on an ELA signal obtained from the image, rather than on the raw image. The ELA signal includes error levels computed at one or more pixels of the image. Typically, the error levels are computed by compressing the image at a known error rate and then by taking the difference pixel-by-pixel between the original image and the compressed image. Pixels with error levels above a defined relative threshold may be identified as having been subject to manipulation.

In an embodiment, rather than using an absolute threshold, the ELA-based classifier may use a relative threshold for different regions of the image. For example, the error levels over the non-portrait photo region of the image may be used to estimate a dynamic and relative threshold for the error levels over the portrait photo region of the image for the classification.

In an embodiment, to improve classification performance, classifiers may be trained using augmented training data designed to simulate the target manipulation space of the classifier. Data augmentation is generally relevant to all types of classifiers, and especially for CNN classifiers.

In an embodiment, the augmented training data may be generated using a style-transfer based network as described in "Gatys et al., *A neural algorithm of artistic style*. arXiv preprint arXiv:1508.06576 (2015)," which is incorporated herein by reference in its entirety. Such network may be configured to generate images that mix the content of a first image with the style of a second image. As would be understood by a person of skill in the art, the implementation would be modified as needed to address the particular problem of the present disclosure.

Figure 6A:
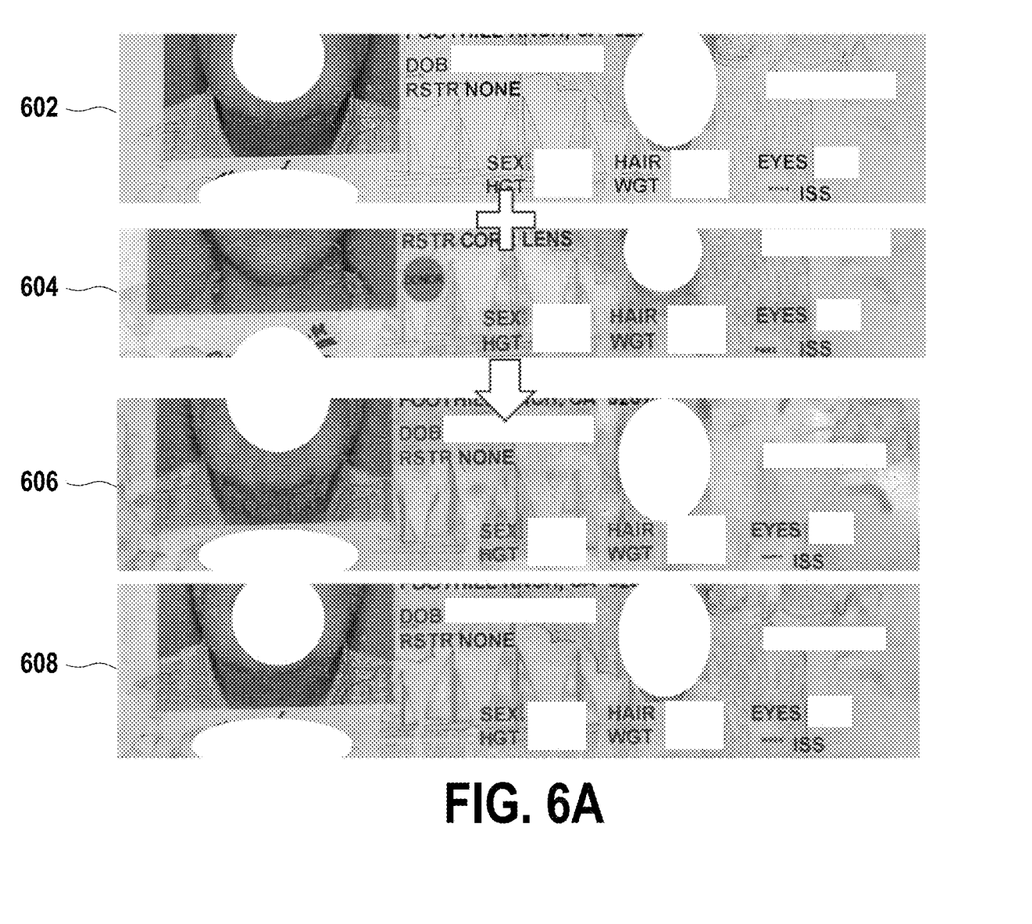
FIG. 6A illustrates the synthesis of an example digital image representative of a manipulated identity document with photo recapture style.

For example, FIG. 6A illustrates the synthesis of example digital images representative of a manipulated identity document with photo recapture style. Specifically, image 602 represents the image which content is to be reproduced in the synthesized image (the content image), and image 604 represents the image which style (photo recapture) is to be transferred into the synthesized image (the style image).

Images 606 and 608 represent respectively coarse-detail and fine-detail synthesized images resulting from mixing content image 602 and style image 604 using a style-transfer based network.

Figure 6B:
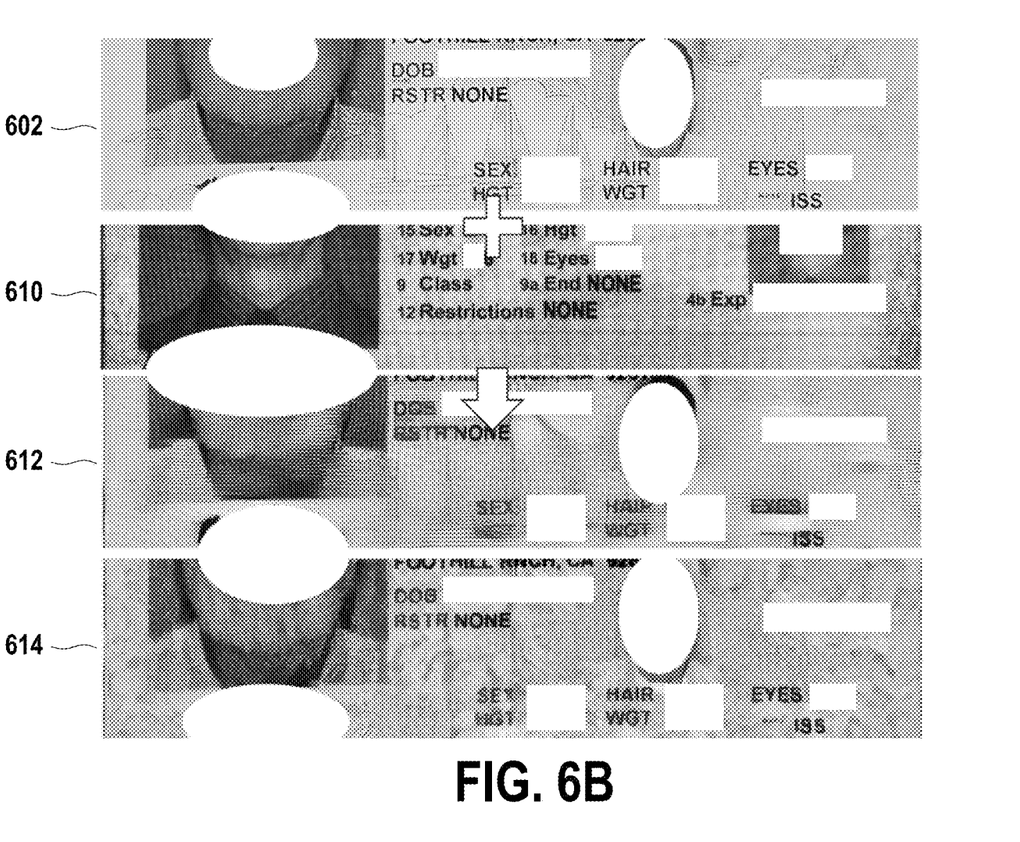
FIG. 6B illustrates the synthesis of an example digital image representative of a manipulated identity document with LCD recapture style.

Similarly, FIG. 6B illustrates the synthesis of a coarse-detail image 612 and of a fine-detail image 614 by mixing content image 602 with a style image 610 having an LCD recapture style, using a style-transfer based network. It is noted that style image 610 may have an entirely different content than content image 602.

As shown in FIGS. 6A and 6B, the mixing of content and style images according to this approach results in the synthesized images having a particular global document style. As such, data augmentation may include not only pixel-level geometric, photometric, and noise-adding operations, but also texture-level data augmentation to generate fraudulent training images with a wider range of pixel correlation or with a periodic texture structure.

Returning to FIG. 1, decision module 134 may be configured to receive the outputs of each of global detector 130 and local detectors 132-1, . . . , 132-$n$. Based on the received outputs, decision module 134 may be configured to determine whether the image 102 has been manipulated or represents a fraudulent identity document.

Figure 7:
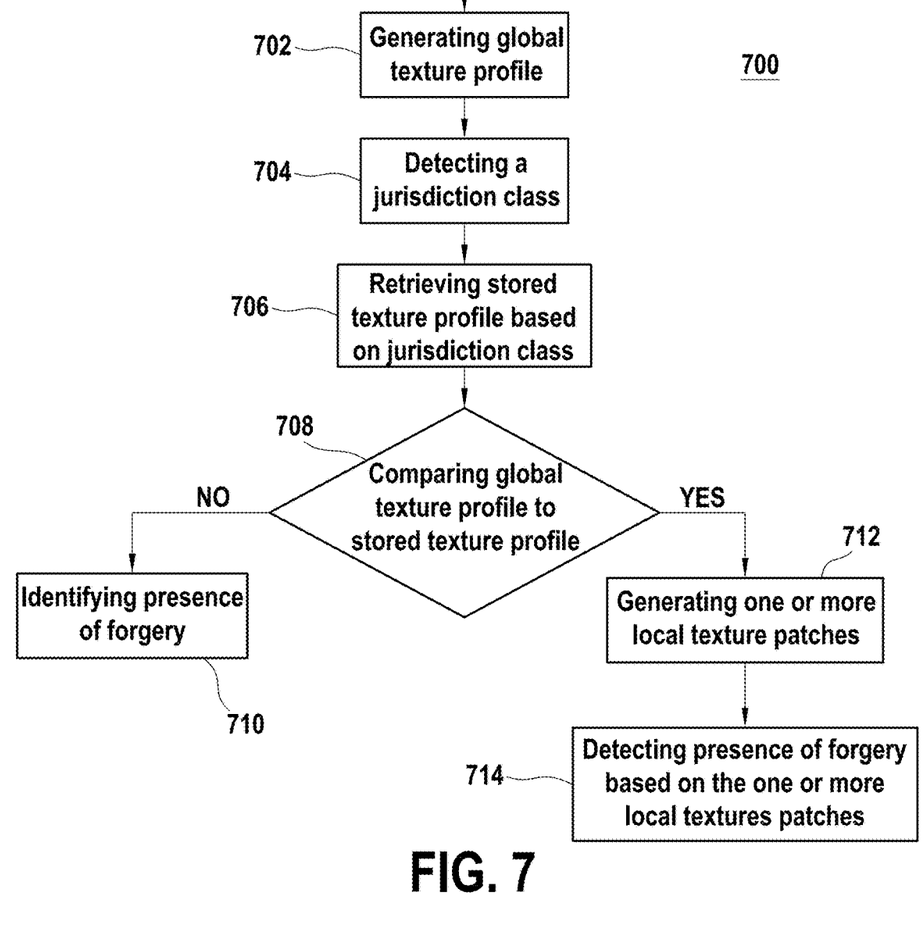
FIG. 7 is a flowchart that illustrates an example process for authenticating a digital identity document according to an embodiment.

FIG. 7 is a flowchart that illustrates an example process 700 for authenticating a digital identity document according to an embodiment. As would be understood by a person of skill in the art based on the teachings herein, process 700 is provided for the purpose of illustration only and is not limiting of embodiments of the present disclosure.

As shown in FIG. 7, process 700 begins in step 702, which includes generating, based on a digital image representative of an ID, a global texture profile representative of global texture information of the ID. The global texture profile may be generated as described above with reference to FIGS. 1, 2A-2B, 4, and 5.

Before, after, or concurrently with step 702, in step 704, the process may include detecting a jurisdiction class of the ID based on the digital image. In an embodiment, step 704 may be performed by a detector such as jurisdiction class detector 114.

Next, step 706 includes retrieving, from a database, a stored texture profile associated with the detected jurisdiction class of the ID. In an embodiment, the stored template corresponds to a previously generated global texture profile for the detected jurisdiction class. The previously generated global texture profile for a jurisdiction class may be generated based on a gallery image for the jurisdiction class.

Subsequently, step 708 includes comparing the global texture profile to a stored texture profile associated with the jurisdiction class of the identity document. In an embodiment, the comparison is made PII insensitive by removing the PII from the digital images before generating the global texture profile and/or the stored texture profile. In another embodiment, the comparison is made less sensitive to ambient illumination variations between the digital image and the gallery image by the choice of descriptors that form the texture profile. In an embodiment, this is made possible by ensuring that the descriptors used in the texture profile consist of only relative information, such as differences (or gradients), correlation coefficients, and statistics of intensity variations and gradients.

If, in step 708, the global texture profile does not match the stored texture profile, process 700 proceeds to step 710, which includes identifying the presence of a forgery in the digital image. For example, step 710 may include identifying the digital image as a recaptured image from a photocopy or a computer screen. Alternatively or additionally, step 710 may include identifying the digital image as having an incorrect background layout for the jurisdiction class of the identity document.

Otherwise, if, in step 708, the global texture profile matches the stored texture profile, process 700 transitions to step 712, which includes generating the one or more local texture patches based on the digital image. The one or more local texture patches may be generated as described above with reference to FIGS. 1 and 3 based on one or more target manipulation spaces. In an embodiment, the target manipulation spaces may include physical portrait photo substitution, digital image splicing, inpainting, resampling, photocopy recapture, or screen recapture.

Process 700 then proceeds to step 714, which includes detecting the presence of a forgery based on the one or more local texture patches. In an embodiment, the detection may be performed as described above using local detectors each configured and trained to detect a specific type of forgery.

Figure 8:
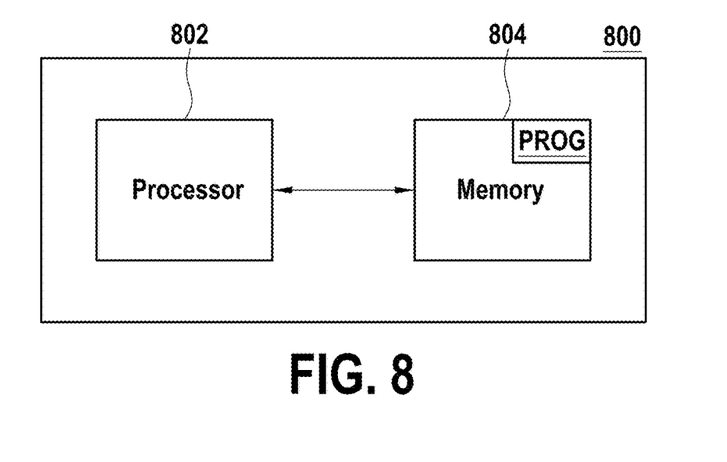
FIG. 8 illustrates an example computer system which may be used to implement embodiments of the present disclosure.

FIG. 8 illustrates a computer system 800 which may be used to implement embodiments of the present invention. According to an embodiment, the above-described authentication system 100 may be implemented using computer system 800.

As shown in FIG. 8, computer system 800 includes a processor 802 and a memory 804. A computer program (PROG) may be stored on memory 804. The computer program may include instructions that, when executed by the processor 802, cause the processor 802 to execute a method for authenticating a digital image representative of an identity document according to any of the embodiments described herein.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

The invention claimed is:

1. A method for authenticating a digital image representative of an identity document (ID), comprising:
generating, based on the digital image, one or more local texture patches representative of texture information of one or more select local blocks of the ID, by:
detecting, for a target manipulation space, one or more features of interest of the ID;
defining the one or more select local blocks of the ID based on the detected one or more features of interest; and
extracting, based on the digital image, texture information at each of the one or more select local blocks of the ID to generate the one or more local texture patches; and
detecting the presence of a forgery in the digital image based on the one or more local texture patches;
wherein the target manipulation space is physical portrait photo substitution, wherein the one or more features of interest comprise a portrait photo of the ID; wherein the one or more select local blocks of the ID comprise one or more blocks straddling a boundary of the portrait photo.

2. The method of claim 1, wherein detecting the presence of a forgery based on the one or more local texture patches comprises:
providing the one or more local texture patches as input to a local detector trained to detect the presence of the forgery for the target manipulation space.

3. The method of claim 2, wherein the local detector comprises one or more of:
a texture-based convolutional neural network (CNN) classifier;
a machine learning-based classifier; or
an Error Level Analysis (ELA)-based classifier.

4. The method of claim 1, comprising:
flat-rendering the digital image prior to generating the one or more local texture patches.

5. A system for authenticating a digital image representative of an identity document (ID), the system comprising:
a processor;
a memory storing instructions that, when executed by the processor, cause the processor to implement; a texture information generator configured to generate, based on the digital image, one or more local texture patches representative of texture information of one or more select local blocks of the ID;
said texture information generator being configured to:
detect, for a target manipulation space, one or more features of interest of the ID;
define the one or more select local blocks of the ID based on the detected one or more features of interest; and
extract, based on the digital image, texture information at each of the one or more select local blocks to generate the one or more local texture patches; and
a detector configured to detect the presence of a forgery in the digital image based on the global texture profile or the one or more local texture patches;
wherein the target manipulation space is physical portrait photo substitution, wherein the one or more features of interest comprise a portrait photo of the ID, and wherein the one or more select local blocks comprise one or more blocks straddling a boundary of the portrait photo.

6. The system of claim 5, wherein the detector comprises a local detector configured to detect, based on the one or more local texture patches, the presence of the forgery for a target manipulation space.

7. The method of claim 6, wherein the local detector comprises one or more of:
a texture-based convolutional neural network (CNN) classifier;
a machine learning-based classifier; or
an Error Level Analysis (ELA)-based classifier.

8. The method of claim 7, wherein the ELA-based classifier employs a dynamic and target-relative threshold for detecting pixel manipulation.

9. A non-transitory computer useable medium having stored thereon instructions that, when executed by a processor, cause the processor to perform a method for authenticating a digital image representative of an identity document (ID), the method comprising:
- generating, based on the digital image, one or more local texture patches representative of texture information of one or more select local blocks of the ID; by:
  - detecting, for a target manipulation space, one or more features of interest of the ID;
  - defining the one or more select local blocks of the ID based on the detected one or more features of interest; and
  - extracting, based on the digital image, texture information at each of the one or more select local blocks to generate the one or more local texture patches,
- and
- detecting the presence of a forgery in the digital image based on the one or more local texture patches;

wherein the target manipulation space is physical portrait photo substitution, wherein the one or more features of interest comprise a portrait photo of the ID, and wherein the one or more select local blocks comprise one or more blocks straddling a boundary of the portrait photo.

10. The non-transitory computer useable medium of claim 9, wherein detecting the presence of the forgery in the digital image is performed based on:
- a texture-based convolutional neural network (CNN) classifier;
- a machine learning-based classifier; or
- an Error Level Analysis (ELA)-based classifier.

11. The non-transitory computer useable medium of claim 10, wherein the ELA-based classifier employs a dynamic and target-relative threshold for detecting pixel manipulation.

* * * * *